United States Patent
Venetsky et al.

(10) Patent No.: US 8,005,257 B2
(45) Date of Patent: Aug. 23, 2011

(54) GESTURE RECOGNITION APPARATUS AND METHOD

(75) Inventors: Larry Venetsky, Mount Laurel, NJ (US); Jeffrey W. Tieman, Leonardtown, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 186 days.

(21) Appl. No.: 12/177,913

(22) Filed: Jul. 23, 2008

(65) Prior Publication Data

US 2010/0013944 A1     Jan. 21, 2010

Related U.S. Application Data

(63) Continuation-in-part of application No. 11/586,750, filed on Oct. 5, 2006, now Pat. No. 7,606,411.

(51) Int. Cl.
*G06K 9/00* (2006.01)
(52) U.S. Cl. ......... 382/100; 382/103; 382/107; 382/170
(58) Field of Classification Search .................. 382/209, 382/103, 107, 117, 118, 153; 348/95, 222.1
See application file for complete search history.

(56) References Cited

U.S. PATENT DOCUMENTS

| | | | |
|---|---|---|---|
| 5,010,500 A * | 4/1991 | Makkuni et al. | 715/863 |
| 5,563,988 A * | 10/1996 | Maes et al. | 345/421 |
| 5,663,514 A * | 9/1997 | Usa | 84/600 |
| 5,759,044 A * | 6/1998 | Redmond | 434/307 R |
| 5,901,246 A * | 5/1999 | Hoffberg et al. | 382/209 |
| 6,256,033 B1 * | 7/2001 | Nguyen | 715/863 |
| 6,335,977 B1 * | 1/2002 | Kage | 382/107 |
| 6,681,031 B2 * | 1/2004 | Cohen et al. | 382/103 |
| 7,027,619 B2 * | 4/2006 | Pavlidis et al. | 382/115 |
| 7,616,233 B2 * | 11/2009 | Steinberg et al. | 348/222.1 |
| 2003/0208335 A1 * | 11/2003 | Unuma et al. | 702/141 |
| 2004/0193413 A1 * | 9/2004 | Wilson et al. | 704/243 |
| 2005/0271279 A1 * | 12/2005 | Fujimura et al. | 382/203 |
| 2007/0110305 A1 * | 5/2007 | Corcoran et al. | 382/167 |
| 2007/0273504 A1 * | 11/2007 | Tran | 340/539.12 |
| 2008/0085048 A1 * | 4/2008 | Venetsky et al. | 382/153 |

* cited by examiner

*Primary Examiner* — Wesley Tucker
*Assistant Examiner* — Aklilu Woldemariam
(74) *Attorney, Agent, or Firm* — Mark D. Kelly; Mark O. Glut

(57) ABSTRACT

A method of identifying a human gesture using a machine includes providing a time sequence of data related to the human gesture; transforming the time sequence of data into waveforms; extracting features from the waveforms; and identifying the human gesture based on the extracted features.

40 Claims, 16 Drawing Sheets

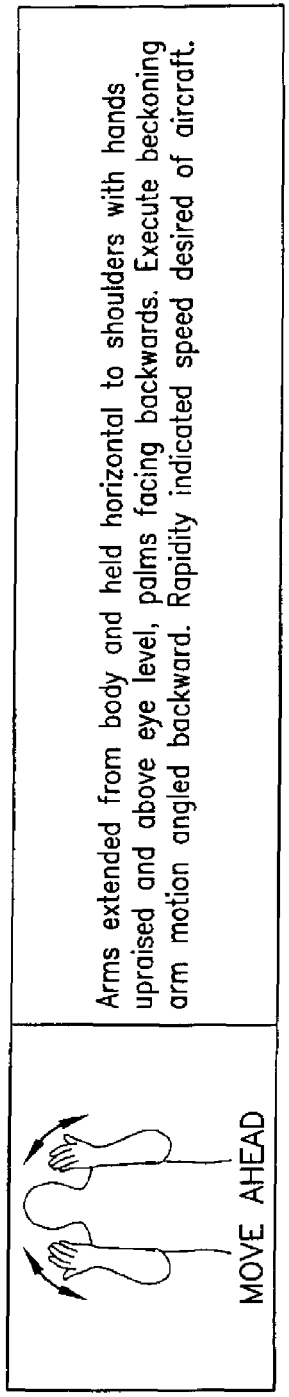

Arms extended from body and held horizontal to shoulders with hands upraised and above eye level, palms facing backwards. Execute beckoning arm motion angled backward. Rapidity indicated speed desired of aircraft.

FIG-3a

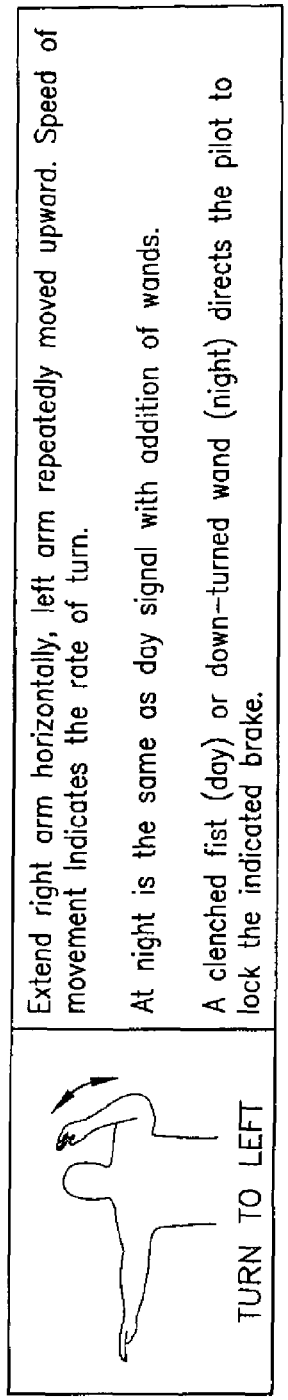

Extend right arm horizontally, left arm repeatedly moved upward. Speed of movement Indicates the rate of turn.

At night is the same as day signal with addition of wands.

A clenched fist (day) or down-turned wand (night) directs the pilot to lock the indicated brake.

FIG-3b

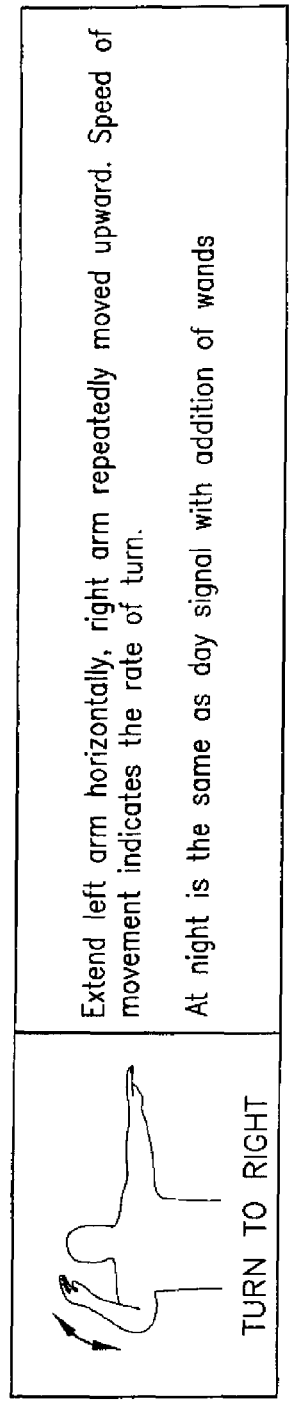

Extend left arm horizontally, right arm repeatedly moved upward. Speed of movement indicates the rate of turn.

At night is the same as day signal with addition of wands

FIG-3c

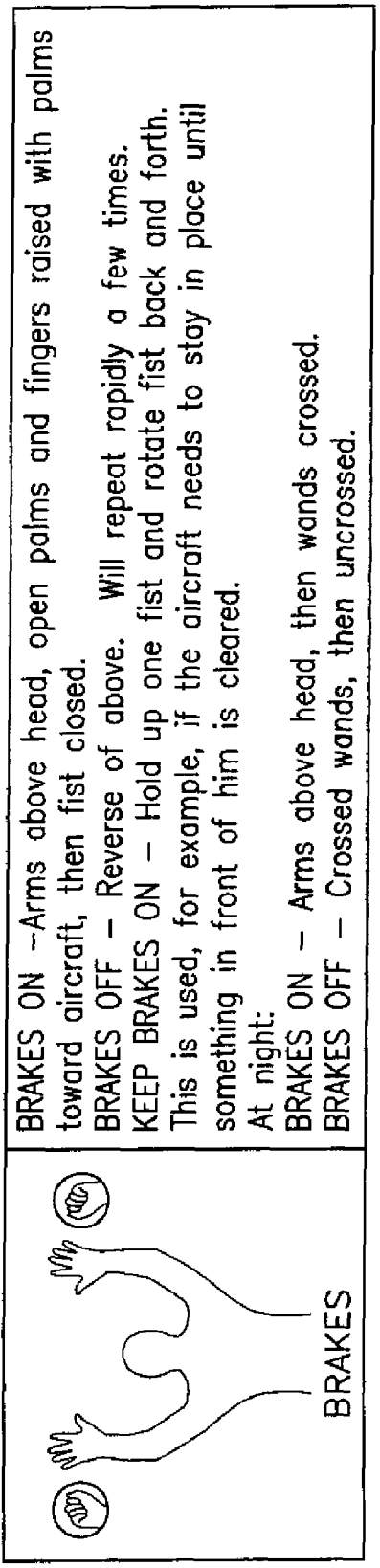

BRAKES ON – Arms above head, open palms and fingers raised with palms toward aircraft, then fist closed.
BRAKES OFF – Reverse of above. Will repeat rapidly a few times.
KEEP BRAKES ON – Hold up one fist and rotate fist back and forth. This is used, for example, if the aircraft needs to stay in place until something in front of him is cleared.
At night:
BRAKES ON – Arms above head, then wands crossed.
BRAKES OFF – Crossed wands, then uncrossed.

FIG-3d

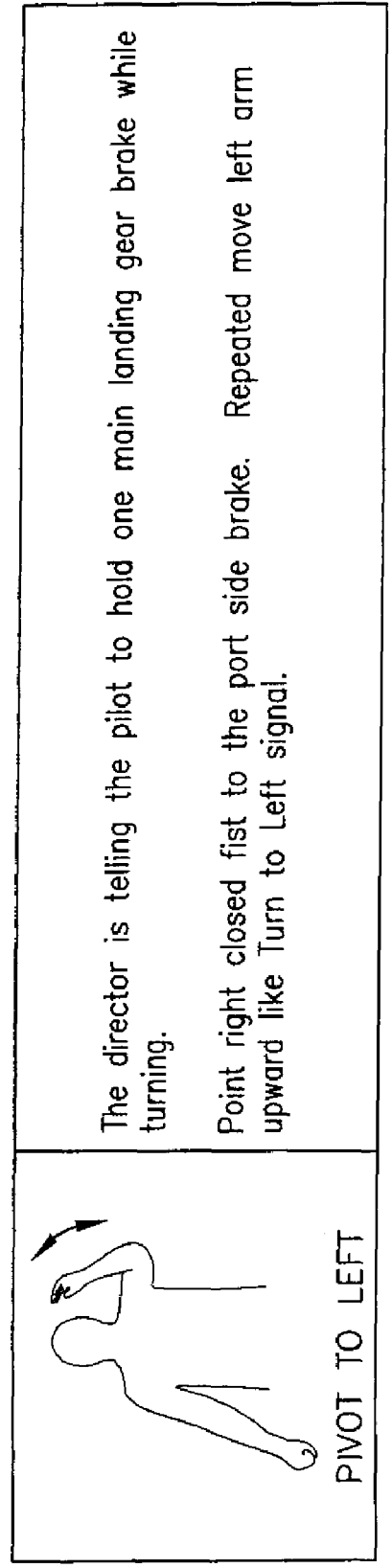

The director is telling the pilot to hold one main landing gear brake while turning.

Point right closed fist to the port side brake. Repeated move left arm upward like Turn to Left signal.

FIG-3e

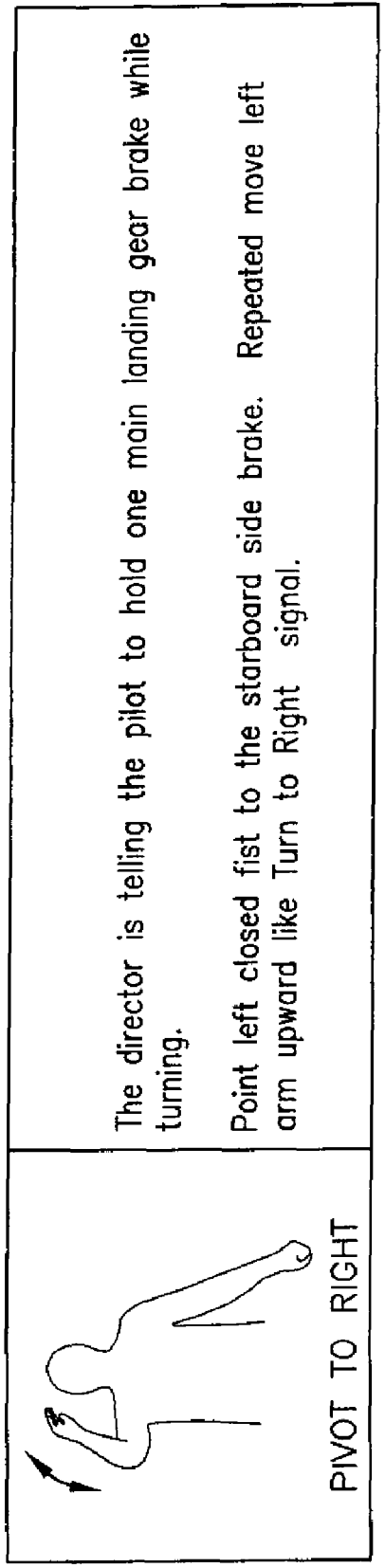

FIG-3f

The director is telling the pilot to hold one main landing gear brake while turning.

Point left closed fist to the starboard side brake. Repeated move left arm upward like Turn to Right signal.

PIVOT TO RIGHT

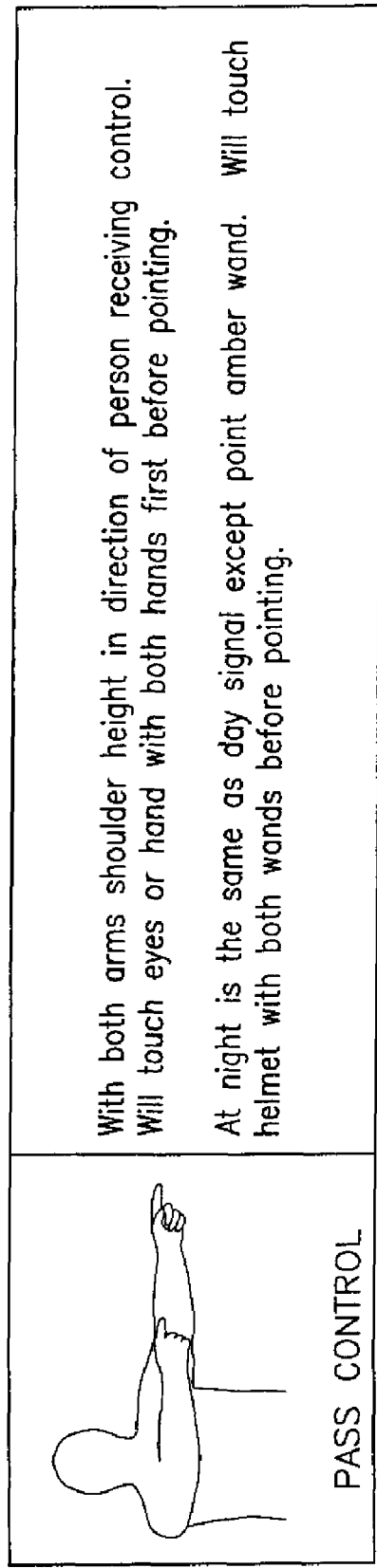

FIG-3g

With both arms shoulder height in direction of person receiving control. Will touch eyes or hand with both hands first before pointing.

At night is the same as day signal except point amber wand. Will touch helmet with both wands before pointing.

PASS CONTROL

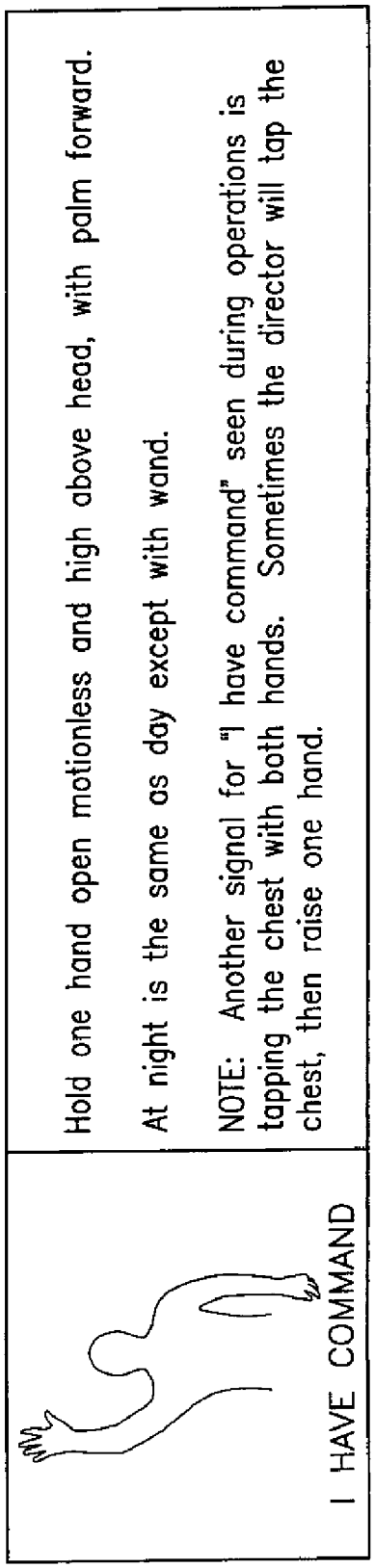

Hold one hand open motionless and high above head, with palm forward.

At night is the same as day except with wand.

NOTE: Another signal for "I have command" seen during operations is tapping the chest with both hands. Sometimes the director will tap the chest, then raise one hand.

I HAVE COMMAND

FIG-3h

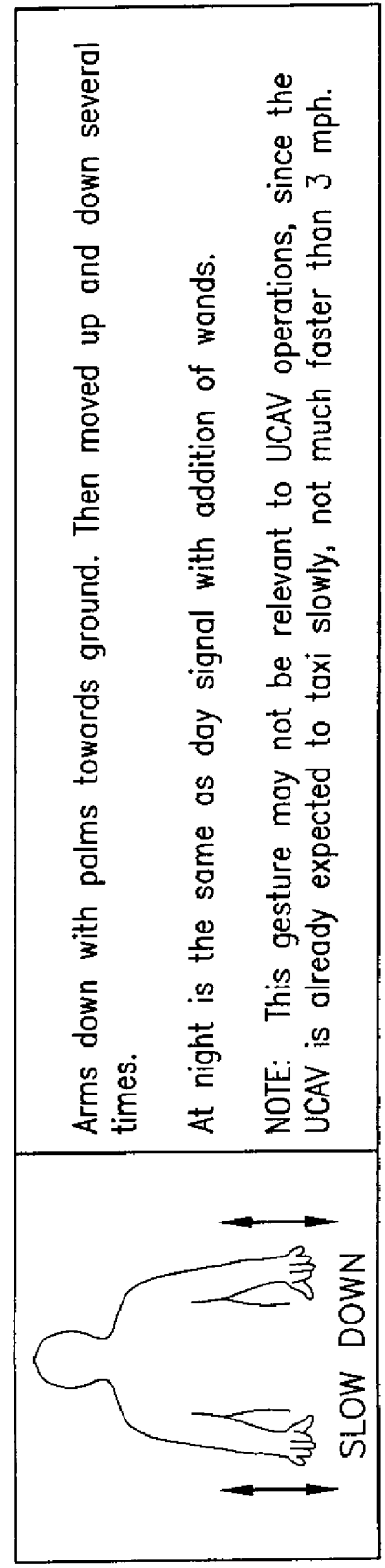

Arms down with palms towards ground. Then moved up and down several times.

At night is the same as day signal with addition of wands.

NOTE: This gesture may not be relevant to UCAV operations, since the UCAV is already expected to taxi slowly, not much faster than 3 mph.

SLOW DOWN

FIG-3i

Arms crossed above the head, palms facing forward.

Same as day signal with addition of wands.

Emergency Stop (as opposed to "brakes on")

Arms by sides, palms facing forward, swept forward and upward repeatedly to shoulder height.

At night is the same as day signal with addition of wands.

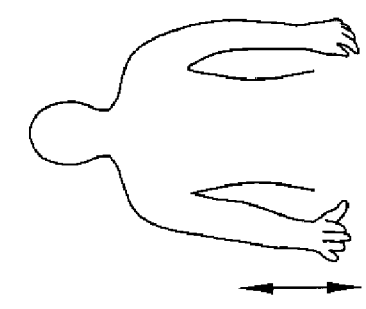

Arms down with palms toward ground, then either right or left arm waved up and down indicating that left or right side engines respectively should be slowed down.

At night is the same as day signal with addition of wands.

NOTE: This gesture has also been observed as: grab one thumb with the other hand and wiggle back and forth.

SLOW DOWN ENGINE(S) ON INDICATED SIDE

FIG-3l

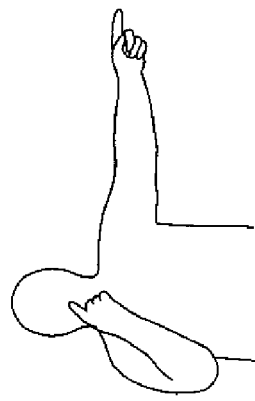

Point to nose with index finger while indicating direction of turn with other index finger.

At night is the same as day signal with addition of wands.

This command is given to the pilot to turn the nose wheel prior to entering the "Y".

ENGAGE NOSEGEAR STEERING

FIG-3m

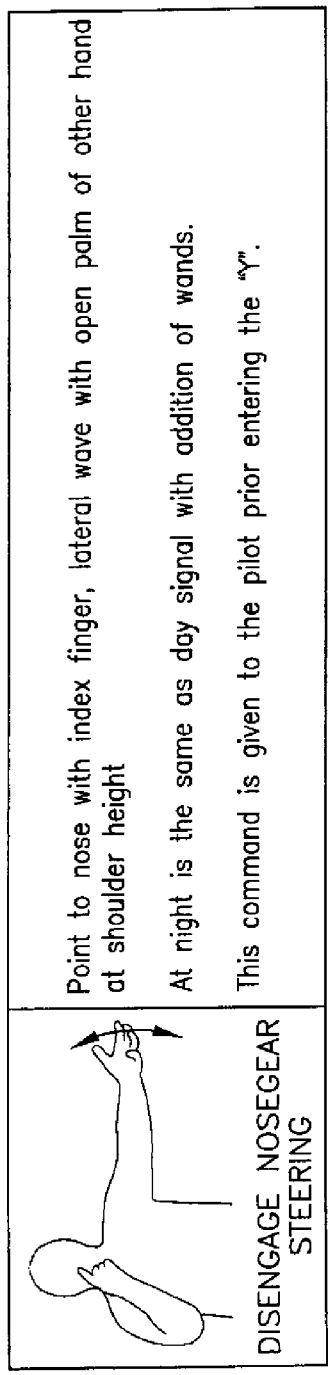

FIG-3n Point to nose with index finger, lateral wave with open palm of other hand at shoulder height. At night is the same as day signal with addition of wands. This command is given to the pilot prior entering the "Y". DISENGAGE NOSEGEAR STEERING

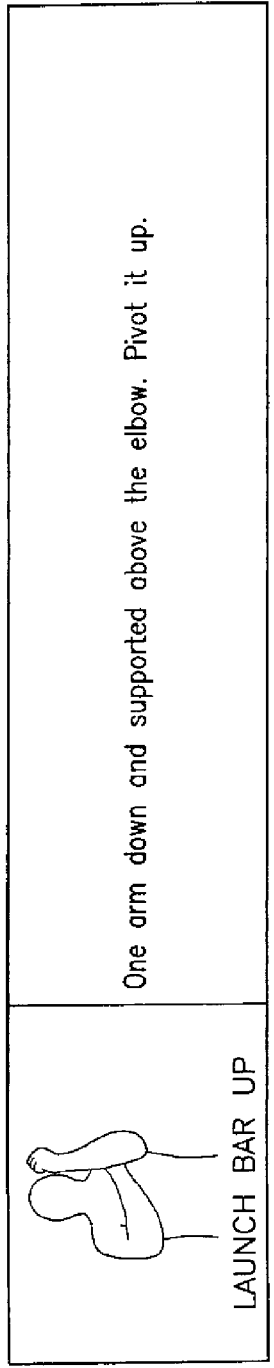

FIG-3o One arm down and supported above the elbow. Pivot it up. LAUNCH BAR UP

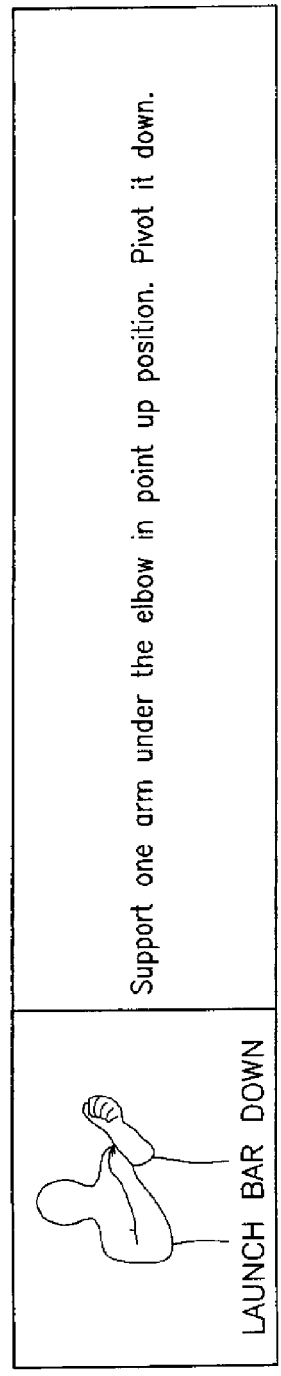

FIG-3p Support one arm under the elbow in point up position. Pivot it down. LAUNCH BAR DOWN Arms hugged around shoulders, then swept straight out to the sides.

At night is the same as day signal with addition of wands.

SPREAD WINGS/ HELICOPTER BLADES

Right fist, thumb extended upward, raised suddenly to meet horizontal palm of left hand.

At night is the same as day signal with addition of wands

UP HOOK

Right fist, thumb extended downward, lowered suddenly to meet horizontal palm of left hand.

At night is the same as day signal with addition of wands.

Arms straight out at sides then swept forward and hugged around shoulders.

At night is the same as day signal with addition of wands.

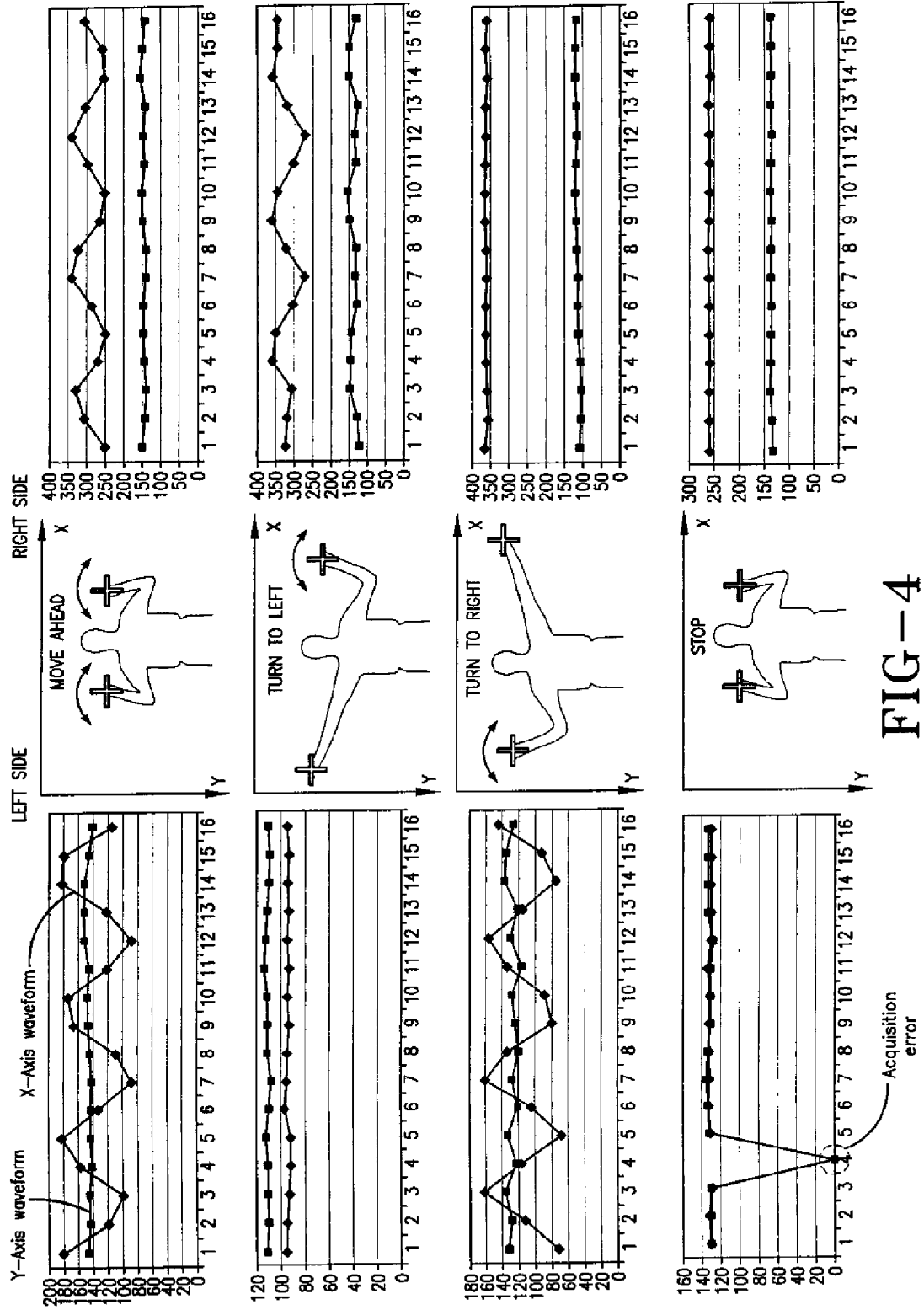

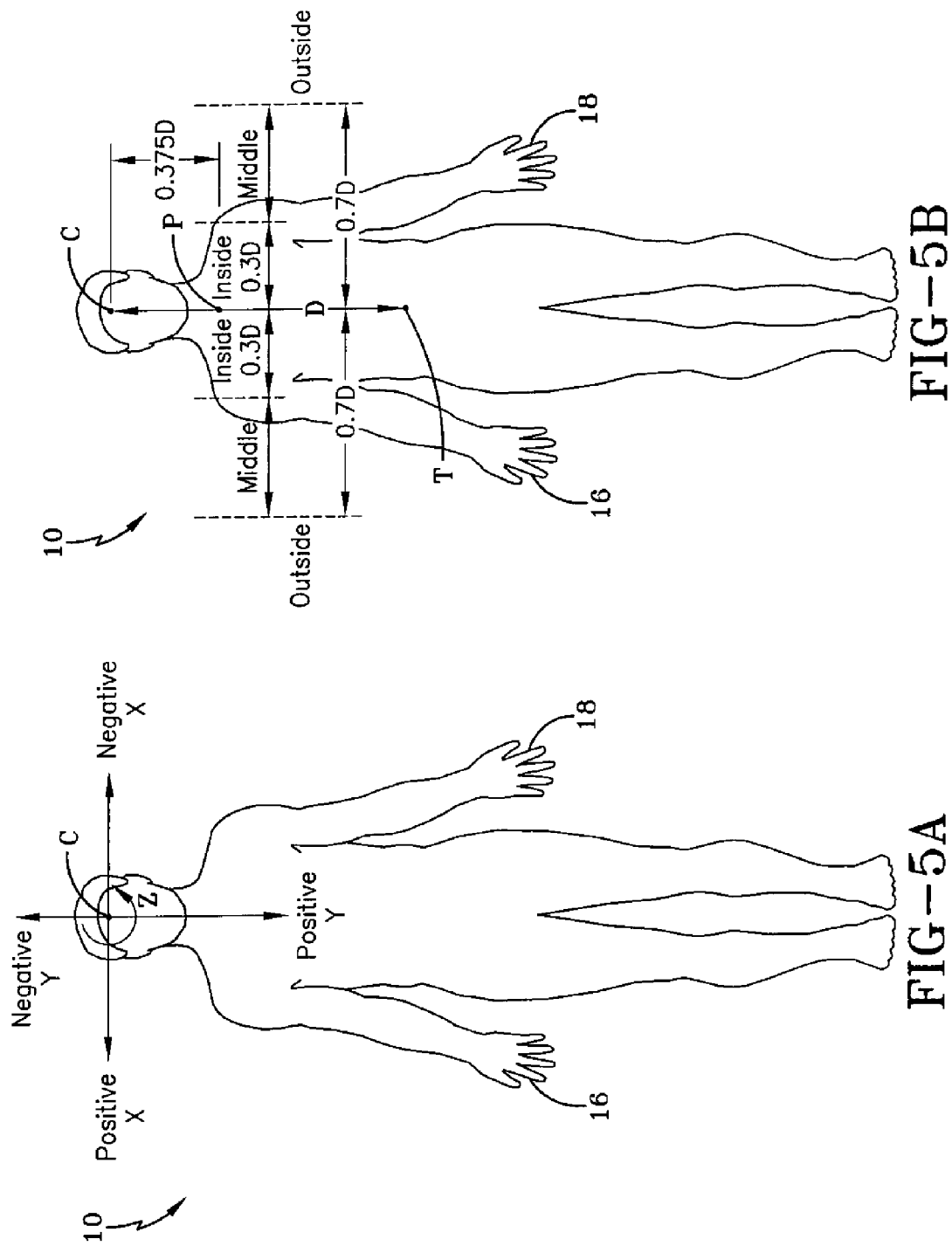

GESTURE RECOGNITION APPARATUS AND METHOD

CROSS REFERENCE TO RELATED APPLICATIONS

This application is a continuation-in-part of U.S. nonprovisional patent application Ser. No. 11/586,750 filed on Oct. 5, 2006, now U.S. Pat. No. 7,606,411 which application is incorporated by reference herein, and the benefit of 35 U.S.C. 120 is claimed.

STATEMENT OF GOVERNMENT INTEREST

The inventions described herein may be manufactured and used by or for the Government of the United States of America for governmental purposes without the payment or any royalties thereon or therefore.

BACKGROUND OF THE INVENTION

The invention relates in general to machine vision and in particular to devices for recognizing human gestures.

Several approaches have been made to perform recognition of human motion, with emphasis on real-time computation. The most frequently used methodologies for recognition of body motion and dynamic gestures are based on the analysis of temporal trajectories of motion parameters, hidden Markov models and state-space models, and static-activity templates. Other conventional techniques have attempted to represent motion by collecting optical flow over the image or region of interest throughout the sequence, although this is computationally expensive and often not robust. Another conventional technique combines several successive layers of image frames of a moving person in a single template. This single template represents temporal history of a motion, allowing a match of actual imagery to a memorized template to produce recognition of a motion gesture.

The above conventional techniques have been conducted in controlled laboratory environments, with fixed lighting and constant distance to the subject. Actual field conditions will present external stimuli, resulting in difficulties in recognition. Thus, it is apparent that different approaches are required for real-life applications outside of a laboratory, such as the flight deck of an aircraft carrier.

Flight deck operations are a "dance of chaos" with steam, constant motion, and crowding. These operations are conducted during day or night, rain or snow, when visibility is extremely poor. Moreover, fleet operations are continually subject to reduced manning and resistance to change. It is desired that, in these kinds of conditions, Unmanned Combat Air Vehicles (UCAV) shall be launched from the flight decks of aircraft carriers.

To launch a UCAV from a flight deck, the UCAV must be controlled during taxiing, before takeoff and after landing. Simply hooking a tow tractor to the aircraft has been considered, but was deemed too slow, especially since the aircraft are required to recover every 45 seconds and need to taxi out of the landing area for the next aircraft. Alternatively, providing the aircraft director/controller with a joystick to control the aircraft would tax his/her workload with an additional process, and would negatively impact training and operations.

Further, if the UCAV is to be controlled on deck using a joystick, the UCAV would necessarily be controlled via radio (RF) link. However, an RF link from a control device to the UCAV is undesirable because of the EMI (electromagnetic interference) intensive environment on the flight deck. Another alternative is a tethered connection, using a control device physically tethered to the UCAV. However, such a tethered connection may be potentially unsafe for the personnel on the deck during high activity periods.

Like manned aircraft, the UCAVs taxi before launch, after recoveries or during re-spotting. In the case of manned aircraft, flight deck controllers signal directions to pilots for taxiing the aircraft around the deck or airfield. It would be desirable if these signals were used to develop an automatic taxiing system for unmanned aircraft as well. If such a system were developed, it would enable a seamless transition of UCAVs into naval aviation.

It is an object of the invention to provide a method and apparatus for the recognition of human gestures by a machine.

It is an object of the invention to provide a method and apparatus for the recognition of human gestures by a machine wherein the method requires much less computation than known methods.

One aspect of the invention is a method of identifying a human gesture comprising providing a time sequence of data related to the human gesture; transforming the time sequence of data into waveforms; extracting features from the waveforms; and identifying the human gesture based on the extracted features.

In one embodiment, the providing step includes providing a time sequence of pixel images of the human gesture using at least one video camera. In another embodiment, the providing step includes providing the data using accelerometers attached to the human.

The extracting step may include extracting static features from the waveforms and may further include extracting dynamic features from the waveforms. In one embodiment, the extracting step includes extracting hand position, phase and frequency from a right hand waveform and a left hand waveform.

The identifying step may include identifying the human gesture by comparing one or more of the hand position, phase and frequency from the right hand waveform and the hand position, phase and frequency from the left hand waveform to at least one rule that describes the human gesture.

The method may further comprise classifying hand positions into vertical and horizontal ranges. The vertical and horizontal ranges are preferably defined in terms of a characteristic length of a human performing the gesture. A preferred characteristic length is the distance from a cranial point to a torso point.

In one embodiment, hand position in the vertical range is determined using a fuzzy logic method.

Another aspect of the invention is a computer readable medium containing a computer program for performing a method of identifying a human gesture, the method comprising transforming a time sequence of data related to the human gesture into waveforms; extracting features from the waveforms; and identifying the human gesture based on the extracted features.

A further aspect of the invention is an apparatus for identifying a human gesture comprising means for providing a time sequence of data related to the human gesture; means for transforming the time sequence of data into waveforms; means for extracting features from the waveforms; and means for identifying the human gesture based on the extracted features.

The means for providing may comprise, for example, accelerometers or at least one video camera. The means for transforming, the means for extracting and the means for identifying may comprise at least one computer.

The invention will be better understood, and further objects, features, and advantages thereof will become more apparent from the following description of the preferred embodiments, taken in conjunction with the accompanying drawings.

BRIEF DESCRIPTION OF THE DRAWINGS

In the drawings, which are not necessarily to scale, like or corresponding parts are denoted by like or corresponding reference numerals.

FIG. 4 shows hand position waveforms for four gestures.

FIG. 5A shows a coordinate system for determining hand position.

FIG. 5B shows hand positions along a horizontal axis.

DETAILED DESCRIPTION OF THE PREFERRED EMBODIMENTS

The invention will be described with reference to signals or gestures used by aircraft carrier personnel to direct pilots onboard an aircraft carrier. FIGS. 3a-3t show some of the gestures used by controllers on aircraft carriers. These gestures may be used to direct a UCAV in accordance with the methods and apparatus of the invention. Although the aircraft carrier control gestures are used to describe the invention, the principles of the invention may be used for recognition of virtually any type of human gesture involving movement of the hands and arms.

The method of the invention may be divided into two main parts: data acquisition and gesture recognition. After gesture recognition occurs, the UCAV or other device responds to the gesture that it has recognized. The UCAV or other device is programmed to respond to the gesture by manipulation of wheels, motors, gears, etc. The programming of the movement of the UCAV or other device is well-known and is not discussed further.

The purpose of data acquisition is to capture a time sequence of data related to the gesture being performed. The data include hand positions and velocities in two or three-dimensional space. Two exemplary devices for acquiring a time sequence of hand positions and velocities are accelerometers and video camera data acquisition systems.

Figure 1B:
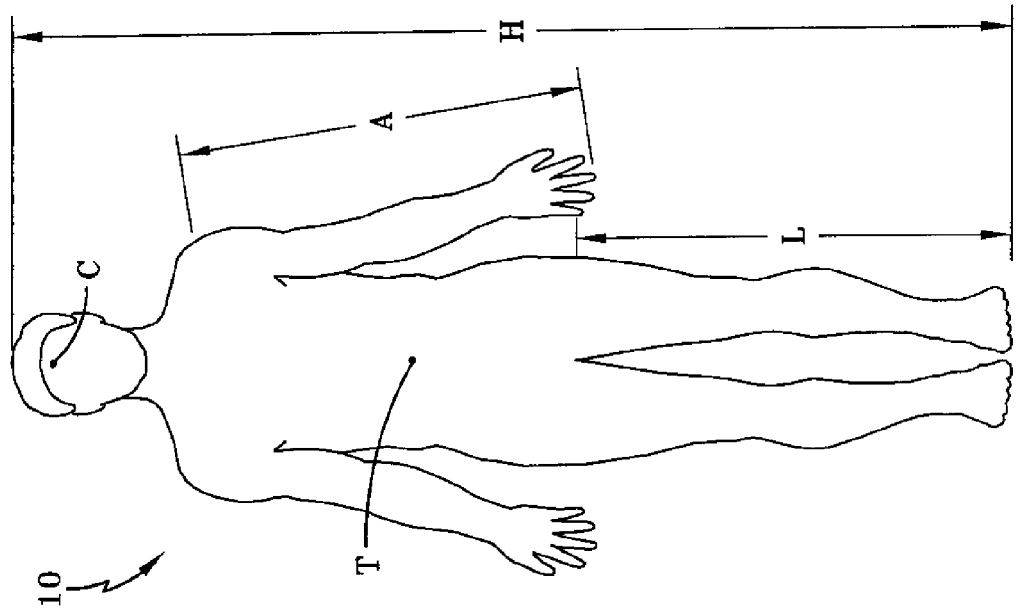
FIGS. 1A and 1B are front views of a human operator.
Figure 1A:
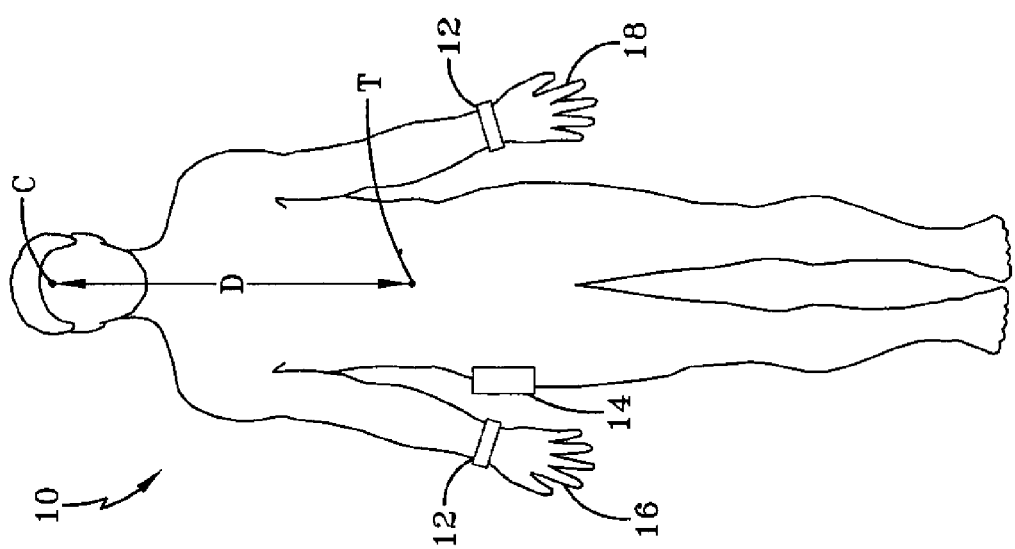

FIG. 1A shows a human 10. Three-axis (X, Y, Z) accelerometers 12 are placed at the wrist locations (right and left) as data acquisition instruments for gestures or signal motions. Data from the accelerometers 12 may be sent via wires to a computer 14 worn on a belt or backpack. Three-axis accelerometers 12 provide hand acceleration data in the x, y and z axes. Before beginning data acquisition, a physical reference dimension of the operator 10 (the person performing the gestures) and the initial position of the operator's hands 16, 18 must be known.

The physical reference dimension is a characteristic length measurement of a human that can be used to calculate the position of the hands with respect to the rest of the body. Examples of characteristic length measurements shown in FIGS. 1A and B are stand-up height H, leg inseam L, arm length A, or distance D from a cranial point C to a torso point T. Given any one of these characteristic lengths, one can use standard anthropomorphic formulas to calculate the other characteristic lengths.

The initial position of the operator's hands is needed to provide the initial conditions or "baseline position" from which subsequent positions may be measured. After the initial conditions are determined, the operator may begin gesturing. During the gesturing, the accelerations of the operator's hands 16, 18 are measured. The accelerations may be integrated to obtain the velocity and the velocity may be integrated to obtain the position or displacement. The hand velocities are used to extract the frequency of cyclic hand motions in all three axes. The hand positions with respect to a cranial point C (or some other reference point) are used to extract vertical and horizontal positions of the hands 16, 18, as well as the phase of the hand motion.

Figure 2:
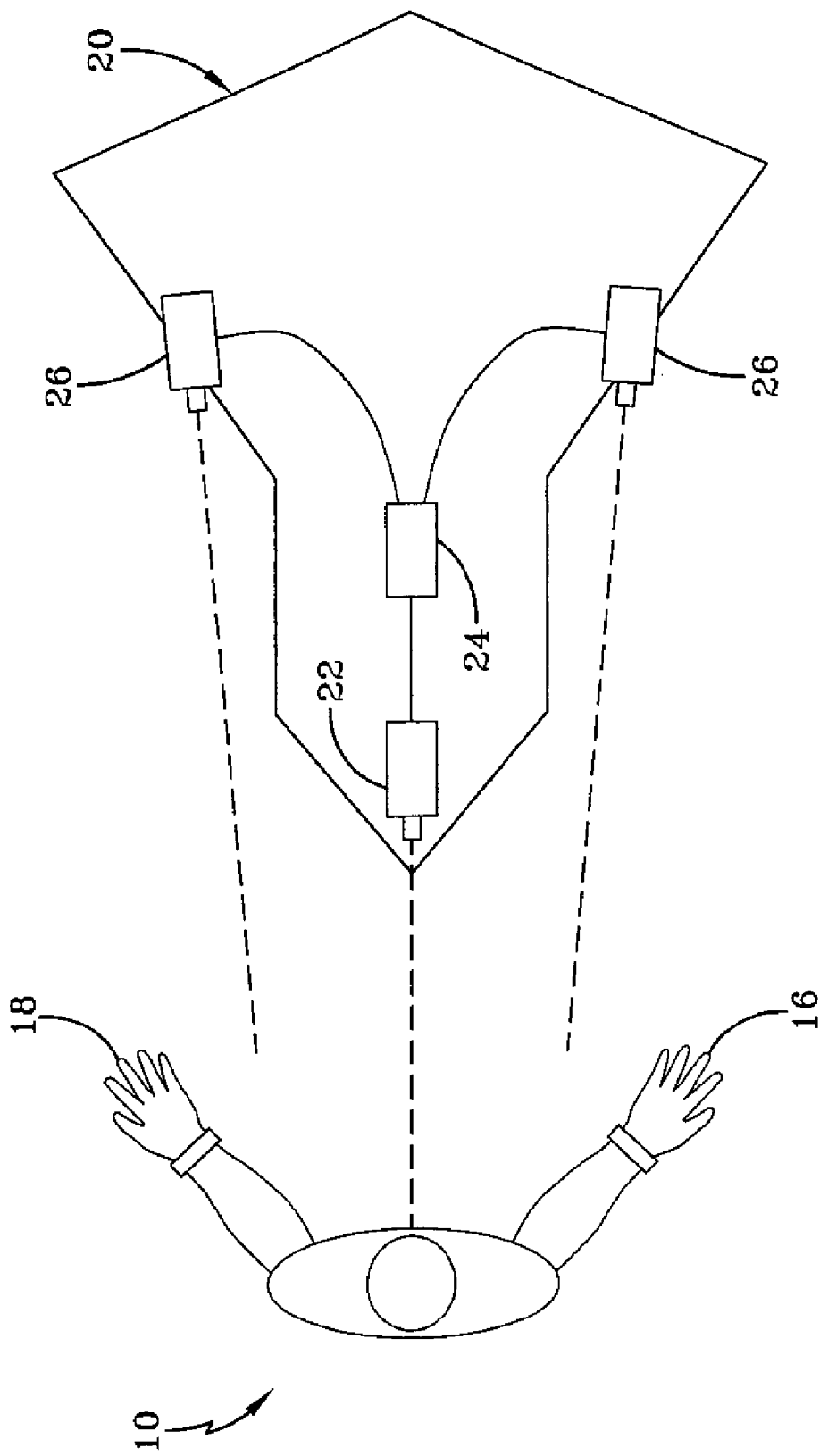
FIG. 2 is a schematic top view of a UCAV.

Another method of data acquisition is using video cameras. FIG. 2 is a schematic top view of a UCAV 20. In the nose, for example, of the UCAV 20 is a video camera 22 connected to a computer 24. In this case, the hands 16, 18 of the operator 10 are tracked by the video camera 22. To track the operator's hands 16, 18, one may use, for example, visible color, active infrared, or retro-reflective markers placed on the hands of the operator 10. In addition, a characteristic length dimension of the operator 10 is marked by one of the types of markers mentioned above. A preferred characteristic length dimension is the distance D (FIG. 1A) between the cranium C and the torso T. It is important to know this dimension to determine the vertical and horizontal position of the hands 16, 18 with respect to the body. The markers may be placed directly on the cranium C and torso T as shown in FIG. 1A.

Although humans vary in size, the proportions between different characteristic lengths of the body are approximately the same. As discussed above, if one characteristic length of a human is known, one can use standard anthropomorphic formulas to calculate the other characteristic lengths. The cranial, torso, left hand and right hand markers enable one to extract the horizontal and vertical positions (x and y axis) of the four points on each frame. These positions may be normalized to the head (cranial marker) so that the head becomes the reference or origin of a Cartesian coordinate system. It is also possible to use two cameras 26 (FIG. 2) in a stereo vision configuration to provide position information for a third dimension (z).

Reliable data acquisition typically includes an error filtering method. Known error filtering methods that may be used in the invention include, for example, a data delay method, a statistical method and a least squares estimate method. The end result of the data acquisition portion of the invention is, for example, a left hand and a right hand waveform. FIG. 4 shows examples of left hand and right hand waveforms for four gestures, MOVE AHEAD, TURN LEFT, TURN RIGHT, and STOP. The horizontal axes of the waveforms represent time and the vertical axes represent position or displacement.

Hand signals typically comprise static poses, dynamic gestures or a combination of both. The dynamic gestures typically are cyclic hand motions in three-dimensional space. The detection of motion requires some threshold because even when a human is not gesturing, there may be some movement. The faster the sampling rate, the less frames that are needed to detect motion. By way of example, if the sampling rate is 10 frames per second, one may use 15-20 frames (about 1.5-2.0 seconds) as a measurement "window." In the case of camera data acquisition, hand movement of 6 pixels per second or greater may be considered as MOTION. Otherwise the hand is judged to have NO MOTION.

Another method for detecting motion is based on the amount of movement of the hands. Specifically, the change in hand position between two consecutive frames is measured. The dimension D (FIG. 1A) is used as a reference dimension. If a hand moves a distance greater than one-fifth of D between two consecutive time frames, then it is judged that the hand has MOTION. If a hand moves a distance equal to or less than one-fifth of D between two consecutive time frames, then it is judged that the hand has NO MOTION.

Once motion has occurred and is detected, the time sequence of hand positions and velocities are used to extract signal features. To obtain the signal features, the sequential hand positions and velocities are accumulated in a data buffer. The length of the data buffer varies depending on the data acquisition rate. Typically, the data buffer should contain approximately 1.5 to 2.0 seconds worth of motion data. The minimum required buffer length is two consecutive data points, that is, two frames. The reliability of the signal feature extraction is proportional to the length of the time buffer. However, a longer time buffer may cause difficulties with transitions between gestures. Therefore, the length of the time buffer may be optimized to ensure reliable signal feature extraction and recognition of transitions between gestures.

FIG. 5A shows an xyz coordinate system for determining hand position. The origin 0,0,0 is at the cranial point C. The positive y axis points downward and the positive x axis points to the right hand side of the human 10 (to the left when viewing FIG. 5A). The z axis is orthogonal to the plane of FIG. 5A. It should be noted that the coordinate system may be varied as to origin and direction as long as a consistent system is used throughout the method. The coordinate system used in the data acquisition shown in FIG. 4 has its origin in the upper left corner of each image (the images are the silhouettes of the human in the center portion of FIG. 4). This coordinate system may be normalized or shifted to obtain the coordinate system shown in FIG. 5A.

In the context of the gestures shown in FIGS. 3a-3t, the positions of the hands have meaning only in relation to their positions with respect to the rest of the body. For any given operator 10, there are variations in hand motion and position each time the same gesture is performed. Also, for any group of operators 10, there are variations in motion and position for the same gesture. Therefore, hand position is determined by classifying all possible hand positions into a few critical ranges. Because humans vary in size, the ranges must be in terms of a characteristic dimension of the human. One could use a variety of characteristic dimensions, but a preferred reference dimension is the distance D between the cranial point C and the torso point T (FIGS. 1A and 5B). The ranges for the positions of the hands are expressed in terms of D.

The ranges for the x axis position of the hands are shown in FIG. 5B. Using the y axis as a vertical centerline, if a hand position is less than 0.3 D from the y axis, the position is INSIDE. If a hand position is from 0.3 D to 0.7 D from the y-axis, the position is MIDDLE. If a hand position is greater than 0.7 D from the y-axis, the position is OUTSIDE.

It is also necessary to determine whether or not an arm is extended. For example, one can raise his arm vertically so that his arm is extended, but still be in the INSIDE position. To determine arm extension, a pivot point P (FIG. 5B) is defined on the positive y axis a distance of 0.375 D from the origin, point C. If the distance between P and the hand 16 or hand 18 is greater than 0.75 D, then the hand 16 or 18 is EXTENDED.

Figure 5C:
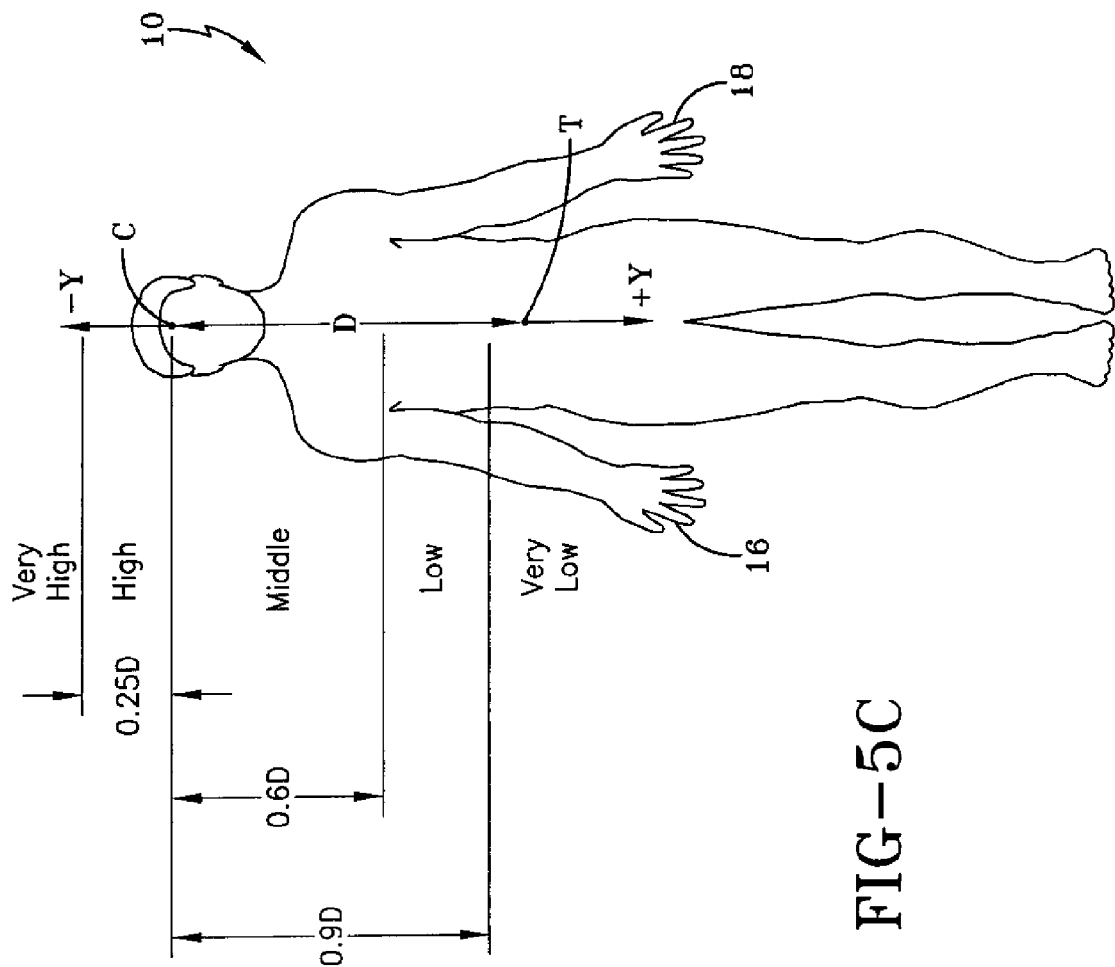
FIG. 5C shows hand positions along a vertical axis.

FIG. 5C shows the ranges for the y axis position of the hands. Starting from the cranial point C, if the vertical distance of the hand is from 0 to 0.25 D above point C, the position is HIGH. If the vertical distance of the hand is above 0.25 D, the position is VERY HIGH. If the vertical distance of the hand is from 0 to 0.6 D below point C, the position is MIDDLE. If the vertical position of the hand is below 0.6 D but above 0.9 D, then the position is LOW. If the vertical position of the hand is 0.9 D or lower, then the position is VERY LOW.

When data is acquired using a video camera 22 (FIG. 2), it is possible that the camera 22 may be vertically higher than the operator 10 such that the camera 22 is viewing the operator 10 from an angle. In that case, the actual y axis position of the hands (FIG. 5C) may be different than the image captured by the camera 22. To correct this distortion, a fuzzy logic method may be used to adjust the height values for the hands. It should be noted that using the fuzzy logic method produces accurate height values for the hands even when there is no distortion due to the vertical camera location.

The theory and methodology of fuzzy logic systems are described in "Fuzzy Logic Systems for Engineering: A Tutorial" by Jerry M. Mandel, IEEE Proceedings, Vol. 83, No. 2, pp. 345-377, March 1995, which is incorporated by reference herein. There is no single, rigid method for designing a fuzzy logic system. One embodiment of a fuzzy logic system for the present invention is a hand height adjuster shown in FIGS. 6 and 7. The fuzzy height detector utilizes a three step process: 1) The crisp value of hand height is fuzzified by computing membership values of the hand height; 2) The membership values are related to their corresponding singleton function; and 3) The fuzzy variables are defuzzified to produce crisp hand positions. In this embodiment, the fuzzification is performed using triangular membership functions that are fixed ahead of time and the defuzzification is performed using singleton functions that allow one to compute a centroid position to thereby obtain a crisp output.

Figure 6:
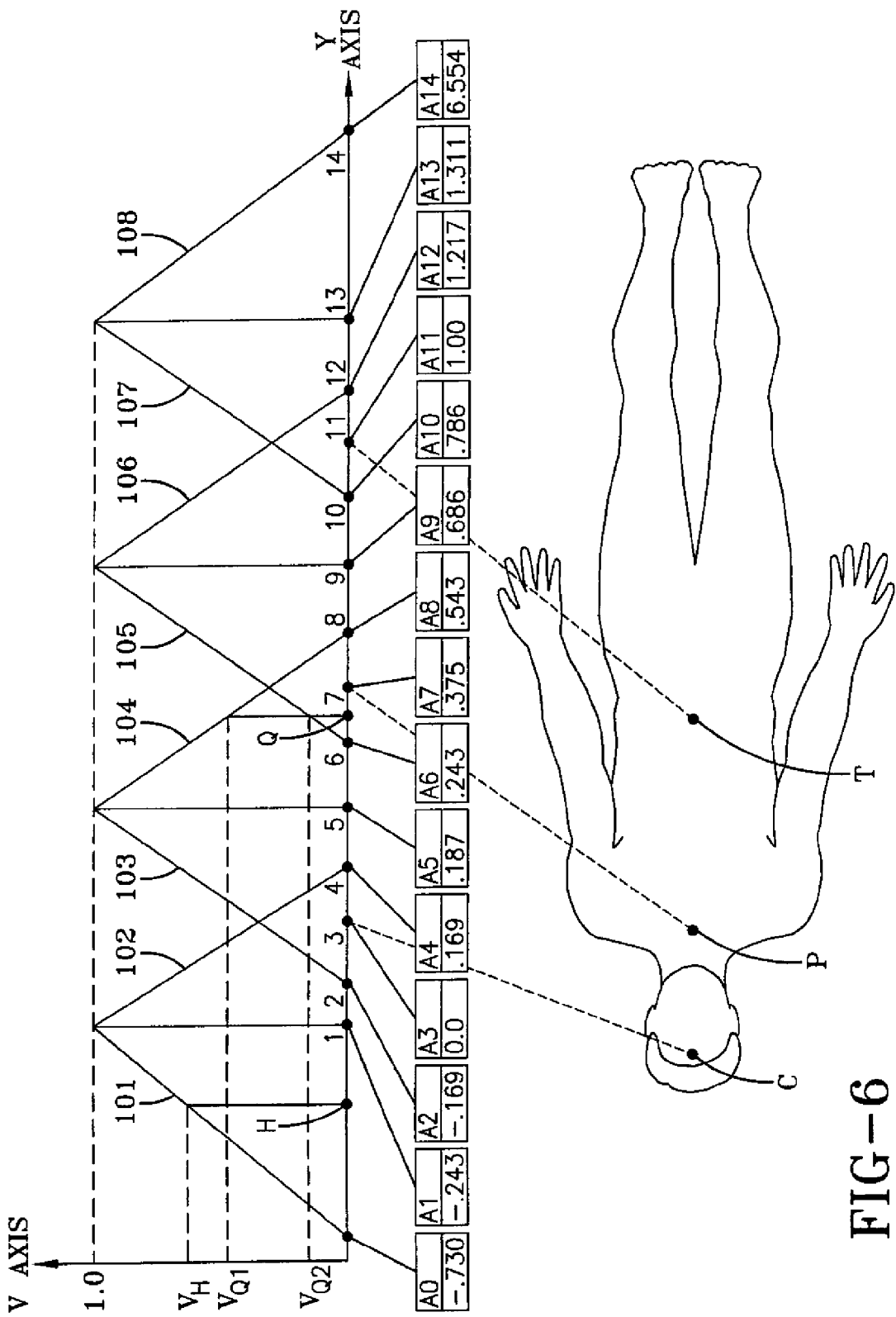
FIGS. 6 and 7 show a fuzzy logic method.

First, the "crisp" vertical hand height value is fuzzified. The crisp value is the value determined by the camera image. FIG. 6 shows a graphical fuzzification method. The horizontal baseline represents the y axis as shown in FIG. 5C. Fifteen anchors points, A0-A14 are chosen. Anchor A3 corresponds to the cranial point C having a y axis value of 0, anchor A7 corresponds to pivot point P (FIG. 5B) and anchor A11 corresponds to the torso point T. The scale of the baseline in FIG. 6 is arbitrary (and is not to scale in FIG. 6). The distance D from point C (A3) to point T (A11) is assigned a value of 1 unit.

The values or distances for each anchor point A1-A14 are shown in FIG. 6. Note that values above the cranial point C are negative, as in FIG. 5C. The construction of the four triangles is based on knowledge of the system characteristics, as described in the Mandel article. The distance on the V axis from each anchor point A1, A5, A9 and A13 to the apex of the respective triangles is 1 (but not necessarily scaled like the baseline). For any crisp y axis position on the baseline, there is at least one fuzzy value that is determined by the intersection of a vertical line from the crisp position on the baseline with the sides of one or more of the triangles. For example, crisp point H has a fuzzy value of $V_H$. Crisp point Q has fuzzy values of $V_{Q1}$ and $V_{Q2}$. The four triangles define eight lines 101-108. Mathematically, each line 101-108 is of the form V=my+b where V is the fuzzy value, m is the slope of the line 101-108 and b is the V axis intercept.

Figure 7:
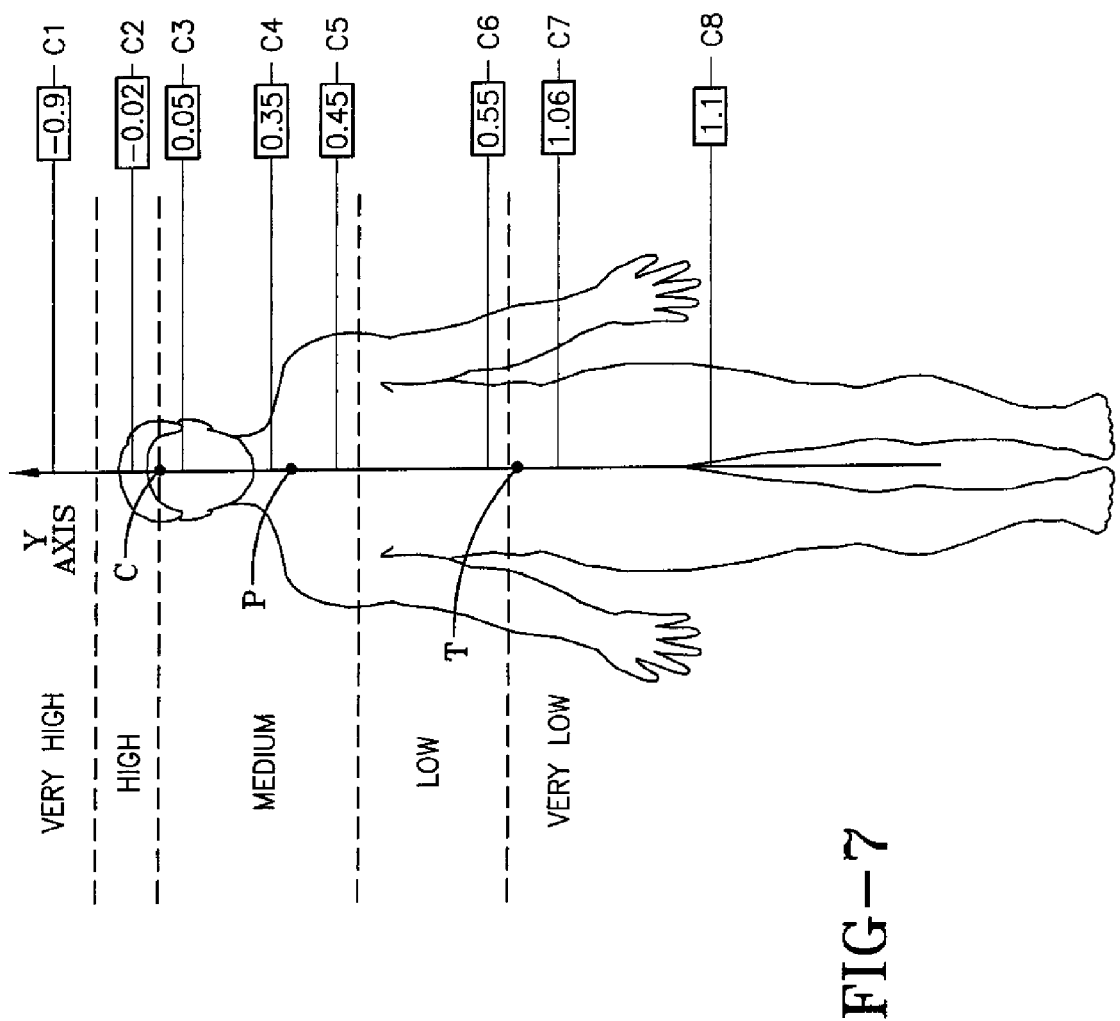

The fuzzy values are then defuzzified using a defuzzifier. FIG. 7 shows a defuzzification method. The y axis ranges VERY HIGH, HIGH, MEDIUM, LOW and VERY LOW are indicated on FIG. 7 as in FIG. 5C. For each of the eight lines 101-108 of FIG. 6, a singleton function C1-C8 is created in FIG. 7. The locations of the singleton functions C1-C8 on the y axis are chosen to minimize or eliminate the distortion caused when the imaging camera is vertically above the operator. The locations of the singleton functions C1-C8 on the y axis, that is, −0.9, −0.02, 0.05, 0.35, 0.45, 0.55, 1.06 and 1.11, are actually coefficients of D, the distance from the cranial point C to the torso point T. For a given y axis hand position, each singleton function C1-C8 has a fuzzy value set V1-V8 that is determined as discussed above with regard to FIG. 6.

The output of the fuzzy logic system for a crisp input is $\Sigma\, C_iV_i/\Sigma\, V_i$, where $C_i$ is the y axis position of each singleton function C1-C8 and $V_i$ is the corresponding fuzzy value(s) for that singleton function. For example, referring to FIG. 6, the crisp y axis value H has only one fuzzy value $V_H$. The vertical line from H intersects line 101 at $V_H$. Because only line 101 is intersected, only the singleton function C1 has a nonzero value. Calculating $\Sigma\, C_iV_i/\Sigma\, V_i$ yields $-0.9 \times V_H/V_H$ equals −0.9, or VERY HIGH. Another example is the crisp point Q (FIG. 6). The vertical line from Q intersects lines 104 and 105 at $V_{Q1}$ and $V_{Q2}$. Only the singleton functions C4 and C5, corresponding to lines 104 and 105 have nonzero values. Calculating $\Sigma\, C_iV_i/\Sigma\, V_i$ yields $(0.35 \times V_{Q1}) + (0.45 \times V_{Q2})/(V_{Q1}+V_{Q2})$. The actual numerical result depends on the values of $V_{Q1}$ and $V_{Q2}$.

Another feature used to characterize gestures is the phase of motion of one hand compared to the phase of motion of the other hand. Phase of motion is relative to each of the x, y and axes. For example, relative to the x axis (FIG. 5A), cyclic motion of the right and left hands is IN-PHASE when the absolute values of the maximum positions (furthest horizontal distances from the origin point C) on the right and left hands is the same or approximately the same and the absolute values of the minimum positions (nearest horizontal distances from the origin point C) of left and right hands is the same or approximately the same. Otherwise, the cyclic motion of the hands with respect to the x axis is OUT-OF-PHASE. Put another way, the hand motion is IN-PHASE with respect to the x axis if both hands are moving toward the zero on the x axis simultaneously or both hands are moving away from zero on the x axis simultaneously. Similarly, the cyclic hand motion may be IN-PHASE or OUT-OF-PHASE with respect to the y and z axes.

For cyclic motions, another identifying feature is the frequency of the motion. In general, the frequency relates to the speed at which the operator 10 desires the UCAV or other device to respond. An exemplary threshold for fast motion is greater than 1 Hertz and for slow motion is less than 0.5 Hertz.

Referring to FIG. 5A, the human 10 is facing forward so that the right hand is 16 and the left hand is 18. In FIGS. 3a-3t, the titles of the gestures are from the point of view of a pilot in an aircraft (or, in the invention, the camera 22 in the UCAV 20). For example, in FIG. 3b, the gesture or command is "Turn to Left." Left is the left hand side of a pilot sitting facing forward in an aircraft. However, the descriptions of the gestures in the boxes in the right side of each FIG. are from the point of view of the operator 10 who is facing the aircraft and actually performing the gesture.

Below is a listing of the gestures shown in FIGS. 3a-3t. For each gesture or command a corresponding rule is given that is used to uniquely identify that command or gesture. The rules are composed of features of combinations of features. The features include one or more of: left and/or right hand position on the x axis (INSIDE, MIDDLE, OUTSIDE); left and/or right hand position on the y axis (VERY LOW, LOW, MIDDLE, HIGH, VERY HIGH), left hand and/or right hand EXTENDED; phase of cyclic hand motion with respect to one or more of the x, y and z axis (IN-PHASE or OUT-OF-PHASE); and frequency of cyclic hand motion (FAST or SLOW). The gesture names listed below correspond to FIGS. 3a-3t. However, for the identifying features included in each rule for each gesture, "right" and "left" correspond to the point of view of the camera (pilot). Thus, the descriptions in the boxes on the right side of FIGS. 3a-3t and the identifying features listed below use opposite conventions for "right" and "left."

Each command or gesture below may be uniquely identified using only x axis and y axis information (two dimensions). However, where z axis features are stated, these features may be used with a three-dimensional data acquisition system to further confirm accuracy of the gesture.

Gestures

FIG. 3a. MOVE AHEAD FAST or MOVE AHEAD SLOW: The y axis position of both hands is MIDDLE or HIGH or VERY HIGH. The x, y and z axis motion of the hands is IN-PHASE. The frequency of both hands is FAST for MOVE AHEAD FAST (greater than 3 Hertz) or SLOW for MOVE AHEAD SLOW (3 Hertz or less).

FIG. 3b. TURN TO LEFT: Left hand is EXTENDED and y axis position of left hand is MIDDLE and left hand NO MOTION on all axes; right hand y axis position is MIDDLE or HIGH or VERY HIGH and right hand has MOTION.

FIG. 3c. TURN TO RIGHT: Right hand is EXTENDED and y axis position of right hand is MIDDLE and right hand NO MOTION on all axes; left hand y axis position is MIDDLE or HIGH or VERY HIGH and left hand has MOTION.

FIG. 3d. BRAKES: This gesture is not presently implemented in the invention.

FIG. 3e. PIVOT TO LEFT: Left hand y axis position is VERY LOW and EXTENDED and NO MOTION; right hand y axis position is MIDDLE or HIGH or VERY HIGH and right hand has MOTION.

FIG. 3f PIVOT TO RIGHT: Right hand y axis position is VERY LOW and EXTENDED and right hand has NO MOTION; Left hand y axis position is MIDDLE or HIGH or VERY HIGH and left hand has MOTION.

FIG. 3g. PASS CONTROL: HAND OFF LEFT: Both hands y axis position is MIDDLE and both hands x axis position is MIDDLE or OUTSIDE and both hands have NO MOTION and both hands x axis position is negative. HAND OFF RIGHT: Both hands y axis position is MIDDLE and both hands x axis position is MIDDLE or OUTSIDE and both hands have NO MOTION and both hands x axis position is positive.

FIG. 3h. I HAVE COMMAND: Left hand y axis position is VERY HIGH, right hand y axis position is VERY LOW, both hands have NO MOTION, left hand x axis position is approximately (i.e. 0.9 to 1.1) equal to right hand x axis position.

FIG. 3i. SLOW DOWN: Both hands y axis position is MIDDLE or LOW, both hands y axis position is approximately equal, both hands have IN PHASE y axis motion and both hands have NO MOTION on x axis.

Figure 3J:
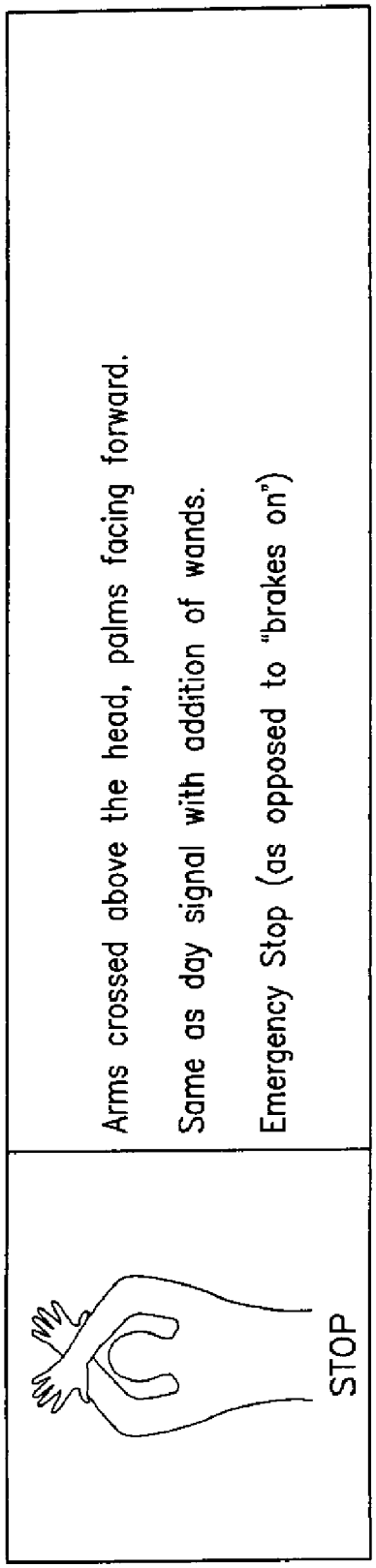
FIGS. 3a-3t show gestures used by controllers on aircraft carriers.

FIG. 3j. STOP: Both hands y axis position is HIGH or VERY HIGH, both hands x axis position is INSIDE, both hands have NO MOTION.

Figure 3K:
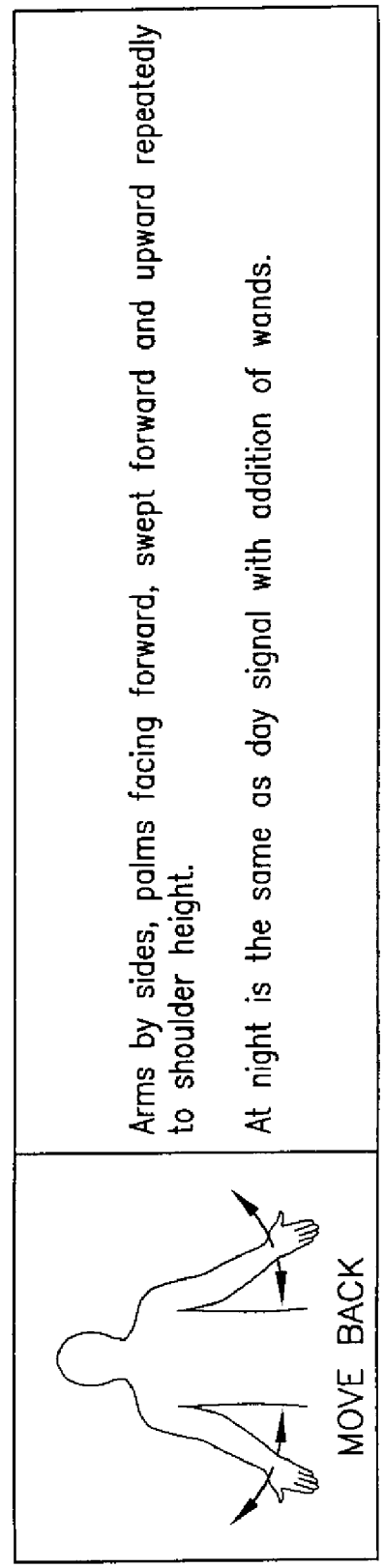

FIG. 3k. MOVE BACK: Both hands y axis position is VERY LOW or LOW, both hands NO MOTION on x axis, both hands IN PHASE on y axis, both hands y axis position approximately equal, both hands IN PHASE on z axis.

FIG. 3l. SLOW DOWN ENGINE(s): ON LEFT INDICATED SIDE: Right hand y axis position is VERY LOW, right hand has NO MOTION, left hand y axis position is MIDDLE or VERY LOW, left hand has y axis MOTION. ON RIGHT INDICATED SIDE: Left hand y axis position is VERY LOW, left hand has NO MOTION, right hand y axis position is MIDDLE or LOW, right hand has y axis MOTION. Neither hand has z axis motion, however, the z axis information would help to distinguish this command from MOVE BACK.

FIG. 3m ENGAGE NOSEGEAR STEERING: RIGHT: Left hand y axis position is MIDDLE, left hand x axis position is INSIDE, left hand NO MOTION, right hand y axis position is MIDDLE, right hand EXTENDED, right hand x axis position is OUTSIDE, right hand NO MOTION. LEFT: Right hand y axis position is MIDDLE, right hand x axis position is INSIDE, right hand has NO MOTION, left hand y axis position is MIDDLE, left hand is EXTENDED, left hand x axis position is OUTSIDE, left hand has NO MOTION.

FIG. 3n. DISENGAGE NOSEGEAR STEERING: RIGHT: Left hand y axis position is MIDDLE, left hand x axis position is INSIDE, left hand has NO MOTION, right hand y axis position is MIDDLE, right hand has y axis MOTION, right hand has NO MOTION on x axis. LEFT: Right hand y axis position is MIDDLE, right hand x axis position is INSIDE, right hand has NO MOTION, left hand y axis position is MIDDLE, left hand has MOTION on y axis, left hand has NO MOTION on x axis.

FIG. 3o. LAUNCH BAR UP: sequence of two distinct positions, 1) both hands x axis position is INSIDE, right hand y axis position is MIDDLE, left hand y axis position is VERY LOW, left hand is EXTENDED, both hands have NO MOTION, then, start a time counter, if within about one second the next condition, 2) right hand y axis position is MIDDLE, both hands x axis position is INSIDE, left hand y axis position is HIGH, both hands have NO MOTION.

FIG. 3p. LAUNCH BAR DOWN: sequence of two distinct positions, 1) Right hand y axis position is MIDDLE, both hands x axis position is INSIDE, left hand y axis position is HIGH, both hands have NO MOTION, then, start a time counter, if within about one second the next condition, 2) Both hands x axis position is INSIDE, right hand y axis position is MIDDLE, left hand y axis position is VERY LOW, left hand is EXTENDED, both hands NO MOTION.

Figure 3Q:
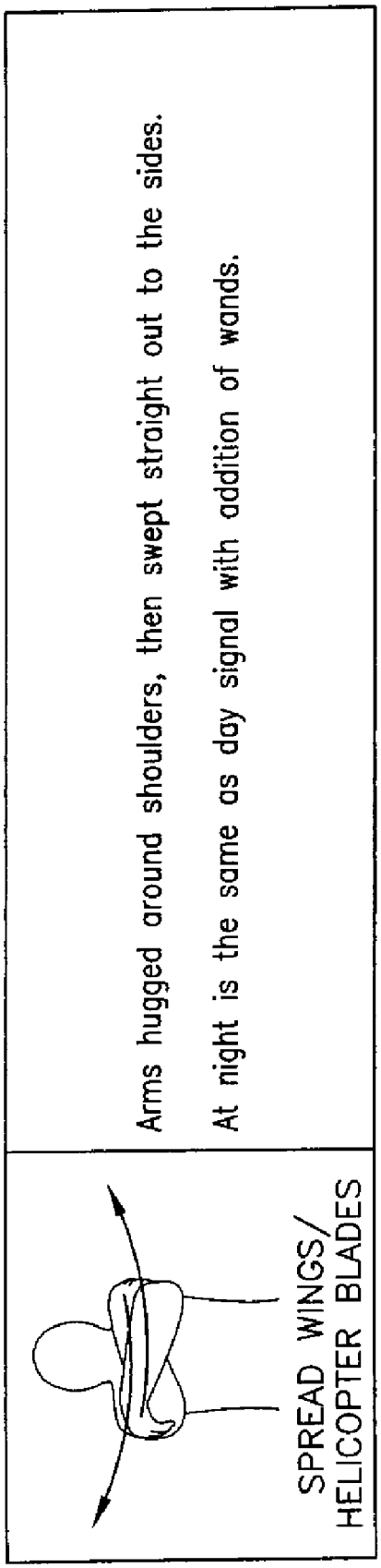

FIG. 3q. SPREAD WINGS/HELICOPER BLADES: sequence of two static poses: 1) both hands y axis position is MIDDLE, both hands x axis position is INSIDE, both hands have NO MOTION, then, within about one second 2) both hands y axis position is MIDDLE, both hands are EXTENDED, both hands have NO MOTION, both hands x axis position is OUTSIDE.

Figure 3R:
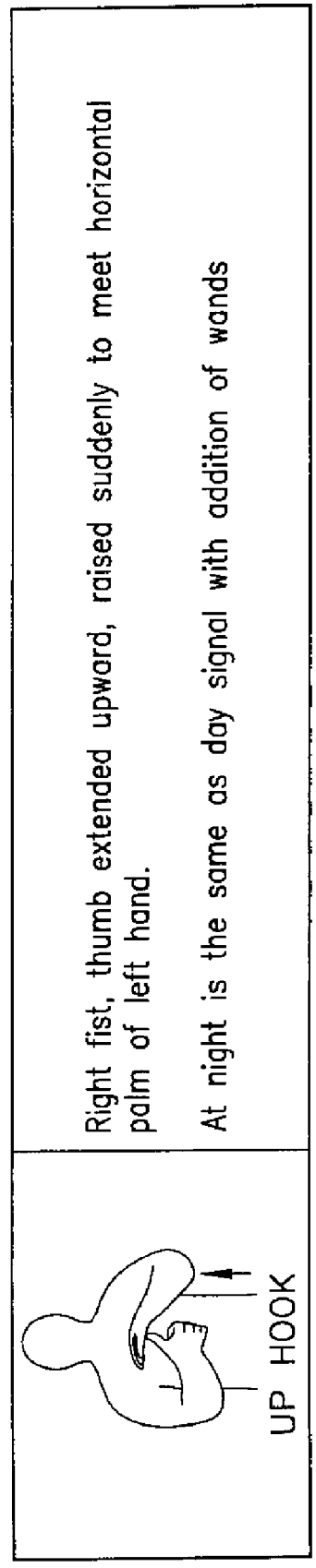

FIG. 3r. UP HOOK: sequence of two static poses: 1) right hand y axis position is MIDDLE, right hand x axis position is INSIDE, right hand has NO MOTION, left hand x axis position is INSIDE, left hand has NO MOTION, left hand is EXTENDED, left hand y axis position is VERY LOW, then, within about one second, the next pose is 2) both hands y axis position is MIDDLE, both hands x axis position is INSIDE, both hands NO MOTION.

Figure 3S:
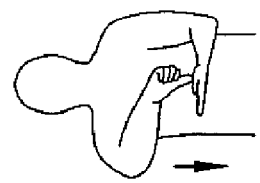
Figure 3T:
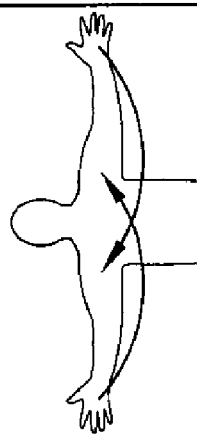

FIG. 3s. DOWN HOOK: sequence of two static poses: 1) right hand y axis position is MIDDLE, right hand x axis position is INSIDE, right hand has NO MOTION, left hand x axis position is INSIDE, left hand has NO MOTION, left hand y axis position is VERY HIGH or HIGH, then within about one second, the next pose is 2) both hands y axis position is MIDDLE, both hands x axis position is INSIDE, both hands NO MOTION.

FIG. 3t. FOLD WINGS/HELICOPTER BLADES: sequence of two static poses: 1) both hands y axis position is MIDDLE, both hands EXTENDED, both hands NO MOTION, both hands x axis position is OUTSIDE, then within about one second the second pose is) both hands y axis position is MIDDLE, both hands x axis position is INSIDE, both hands NO MOTION.

Of course, many other types of gestures are susceptible to recognition using the invention. The invention has been tested and proven in a laboratory environment using an off-the-shelf video camera and a computer mounted on a wheeled robot. Visible color markers worn by the operator were used for data acquisition. The computer successfully recognized various gestures and the wheeled robot responded accordingly.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. A method of identifying a human gesture, performed, at least in part, with one or more processors, comprising:
   providing a time sequence of data related to the human gesture;
   transforming the time sequence of data into waveforms comprising a right hand waveform and a left hand waveform;
   extracting features from the waveforms, wherein the extracting step comprises extracting static features from the waveforms including hand position, and dynamic features from the waveforms, including phase and frequency from the right hand waveform and phase and frequency from the left hand waveform; and
   identifying the human gesture based on the extracted features by comparing one or more of the hand position, phase, and frequency from the right hand waveform and the hand position, phase, and frequency from the left hand waveform to a rule that describes the human gesture,
   the rule composed of the features or combinations of the features, that are used to identify uniquely the human gesture.

2. The method of claim 1 wherein the providing step includes providing a time sequence of pixel images of the human gesture using at least one video camera.

3. The method of claim 1 wherein the providing step includes providing the data using accelerometers attached to the human.

4. The method of claim 1 wherein the transforming step includes transforming the data into waveforms that are normalized to a cranial location.

5. The method of claim 1 further comprising classifying hand positions into vertical and horizontal ranges.

6. The method of claim 5 wherein the vertical and horizontal ranges are defined in terms of a characteristic length of a human performing the gesture.

7. The method of claim 6 wherein the characteristic length is a distance D from a cranial point to a torso point.

8. The method of claim 7 wherein the vertical ranges comprise five ranges, a VERY HIGH range being more than 0.25D above the cranial point, a HIGH range being from the cranial point to 0.25D above the cranial point, a MIDDLE range being from the cranial point to 0.6D below the cranial point, a LOW range being below 0.6D but above 0.9D, and a VERY LOW range being 9D or lower.

9. The method of claim 7 wherein the horizontal ranges comprise three ranges, an INSIDE range being from 0 to less than 0.30 from a vertical axis of the human, a MIDDLE range being from 0.3D to 0.7D from the vertical axis and an OUTSIDE range being greater than 0.7D from the vertical axis.

10. The method of claim 7 further comprising classifying a hand position as EXTENDED if a distance from the hand position to a point that is 0.3750 vertically below the cranial point is greater than 0.750.

11. The method of claim 1 further comprising classifying cyclic hand movement with respect to an axis as IN-PHASE if absolute values of maximum positions of the right and left hands from the origin, measured along the axis, are the same or approximately the same, and absolute values of minimum positions of the right and left hands from the origin, measured along the axis, are the same or approximately the same.

12. The method of claim 5 wherein hand position in the vertical range is determined using a fuzzy logic method.

13. The method of claim 1 wherein the gesture is MOVE AHEAD and the rule is a y axis position of both hands is MIDDLE or HIGH or VERY HIGH; and x axis and y axis motion of the hands is IN-PHASE.

14. The method of claim 1 wherein the gesture is TURN TO LEFT and the rule is left hand is EXTENDED and y axis position of left hand is MIDDLE and left hand NO MOTION on all axes; right hand y axis position is MIDDLE or HIGH or VERY HIGH and right hand has MOTION.

15. The method of claim 1 wherein the gesture is TURN TO RIGHT and the rule is right hand is EXTENDED and y axis position of right hand is MIDDLE and right hand NO MOTION on all axes; left hand y axis position is MIDDLE or HIGH or VERY HIGH and left hand has MOTION.

16. The method of claim 1 wherein the gesture is PIVOT TO LEFT and the rule is left hand y axis position is VERY LOW and EXTENDED and NO MOTION; right hand y axis position is MIDDLE or HIGH or VERY HIGH and right hand has MOTION.

17. The method of claim 1 wherein the gesture is PIVOT TO RIGHT and the rule is right hand y axis position is VERY LOW and right hand is EXTENDED and right hand has NO MOTION; left hand y axis position is MIDDLE or HIGH or VERY HIGH and left hand has MOTION.

18. The method of claim 1 wherein the gesture is PASS CONTROL: HAND OFF LEFT and the rule is both hands y axis position is MIDDLE and both hands x axis position is MIDDLE or OUTSIDE and both hands have NO MOTION and both hands x axis position is negative.

19. The method of claim 1 wherein the gesture is PASS CONTROL: HAND OFF RIGHT and the rule is both hands y axis position is MIDDLE and both hands x axis position is MIDDLE or OUTSIDE and both hands have NO MOTION and both hands x axis position is positive.

20. The method of claim 1 wherein the gesture is I HAVE COMMAND and the rule is left hand y axis position is VERY HIGH, right hand y axis position is VERY LOW, both hands have NO MOTION, left hand x axis position is approximately equal to right hand x axis position.

21. The method of claim 1 wherein the gesture is SLOW DOWN and the rule is both hands y axis position is MIDDLE or LOW, both hands y axis position is approximately equal, both hands have IN PHASE y axis motion and both hands have NO MOTION on x axis.

22. The method of claim 1 wherein the gesture is STOP and the rule is both hands y axis position is HIGH or VERY HIGH, both hands x axis position is INSIDE, both hands have NO MOTION.

23. The method of claim 1 wherein the gesture is MOVE BACK and the rule is both hands y axis position is VERY LOW or LOW, both hands NO MOTION on x axis, both hands IN PHASE on y axis, both hands y axis position approximately equal, both hands IN PHASE on z axis.

24. The method of claim 1 wherein the gesture is SLOW DOWN ENGINE(S) ON LEFT INDICATED SIDE and the rule is right hand y axis position is VERY LOW, right hand has NO MOTION, left hand y axis position is MIDDLE or VERY LOW, left hand has y axis MOTION.

25. The method of claim 1 wherein the gesture is SLOW DOWN ENGINE(S) ON RIGHT INDICATED SIDE and the rule is left hand y axis position is VERY LOW, left hand has NO MOTION, right hand y axis position is MIDDLE or LOW, right hand has y axis MOTION.

26. The method of claim 1 wherein the gesture is ENGAGE NOSEGEAR STEERING RIGHT and the rule is left hand y axis position is MIDDLE, left hand x axis position is INSIDE, left hand NO MOTION, right hand y axis position is MIDDLE, right hand is EXTENDED, right hand x axis position is OUTSIDE, right hand has NO MOTION.

27. The method of claim 1 wherein the gesture is ENGAGE NOSEGEAR LEFT and the rule is right hand y axis position is MIDDLE, right hand x axis position is INSIDE, right hand has NO MOTION, left hand y axis position is MIDDLE, left hand is EXTENDED, left hand x axis position is OUTSIDE, left hand has NO MOTION.

28. The method of claim 1 wherein the gesture is DISENGAGE NOSEGEAR STEERING RIGHT and the rule is left hand y axis position is MIDDLE, left hand x axis position is INSIDE, left hand has NO MOTION, right hand y axis position is MIDDLE) right hand has y axis MOTION, right hand has NO MOTION on x axis.

29. The method of claim 1 wherein the gesture is DISENGAGE NOSEGEAR STEERING LEFT and the rule is right hand y axis position is MIDDLE, right hand x axis position is INSIDE, right hand has NO MOTION, left hand y axis position is MIDDLE, left hand has MOTION on y axis, left hand has NO MOTION on x axis.

30. The method of claim 1 wherein the gesture is LAUNCH BAR UP and the rule is a sequence of two distinct positions, 1) both hands x axis position is INSIDE, right hand y axis position is MIDDLE, left hand y axis position is VERY LOW, left hand is EXTENDED, both hands have NO MOTION, then, within about one second, 2) right hand y axis position is MIDDLE, both hands x axis position is INSIDE, left hand y axis position is HIGH, both hands have NO MOTION.

31. The method of claim 1 wherein the gesture is LAUNCH BAR DOWN and the rule is a sequence of two distinct positions, 1) right hand y axis position is MIDDLE, both hands x axis position is INSIDE, left hand y axis position is HIGH) both hands have NO MOTION, then, within about one second, 2) both hands x axis position is INSIDE, right hand y axis position is MIDDLE, left hand y axis position is VERY LOW, left hand is EXTENDED, both hands NO MOTION.

32. The method of claim 1 wherein the gesture is SPREAD WINGSIHELICOPER BLADES and the rule is a sequence of two static poses: 1) both hands y axis position is MIDDLE, both hands x axis position is INSIDE, both hands have NO MOTION, then, within about one second 2) both hands y axis position is MIDDLE, both hands are EXTENDED, both hands have NO MOTION, both hands x axis position is OUTSIDE.

33. The method of claim 1 wherein the gesture is UP HOOK and the rule is a sequence of two static poses: 1) right hand y axis position is MIDDLE, right hand x axis position is INSIDE, right hand has NO MOTION, left hand x axis position is INSIDE, left hand has NO MOTION, left hand is EXTENDED, left hand y axis position is VERY LOW, then, within about one second, 2) both hands y axis position is MIDDLE, both hands x axis position is INSIDE, both hands NO MOTION.

34. The method of claim 1 wherein the gesture is DOWN HOOK and the rule is a sequence of two static poses: 1) right hand y axis position is MIDDLE, right hand x axis position is INSIDE, right hand has NO MOTION, left hand x axis position is INSIDE, left hand has NO MOTION, left hand y axis position is VERY HIGH or HIGH, then within about one second, the next pose is 2) both hands y axis position is MIDDLE, both hands x axis position is INSIDE, both hands have NO MOTION.

35. The method of claim 1 wherein the gesture is FOLD WINGS/HELICOPTER BLADES and the rule is a sequence of two static poses: 1) both hands y axis position is MIDDLE, both hands are EXTENDED, both hands have NO MOTION, both hands x axis position is OUTSIDE, then within about one second 2) both hands y axis position is MIDDLE, both hands x axis position is INSIDE, both hands have NO MOTION.

36. A non-transitory computer readable medium containing a computer program for performing a method of identifying a human gesture, the method comprising transforming a time sequence of data related to the human gesture into waveforms comprising a right hand waveform and a left hand waveform;
   extracting features from the waveforms, wherein the extracting step comprises extracting static features from the waveforms including hand position, and dynamic features from the waveforms, including phase and frequency from the right hand waveform and phase and frequency from the left hand waveform; and
   identifying the human gesture based on the extracted features by comparing one or more of the hand position, phase, and frequency from the right hand waveform and the hand position, phase, and frequency from the left hand waveform to a rule that describes the human gesture, the rule composed of the features or combinations of the features, that are used to identify uniquely the human gesture.

37. An apparatus for identifying a human gesture, comprising:
   means for providing a time sequence of data related to the human gesture;
   means for transforming the time sequence of data into waveforms comprising a right hand waveform and a left hand waveform;
   means for extracting features from the waveforms, wherein the extracting step comprises extracting static features from the waveforms including hand position, and dynamic features from the waveforms, including phase and frequency from the right hand waveform and phase and frequency from the left hand waveform; and
   means for identifying the human gesture based on the extracted features by comparing one or more of the hand position, phase, and frequency from the right hand waveform and the hand position, phase, and frequency from the left hand waveform to a rule that describes the human gesture, the rule composed of the features or combinations of the features, that are used to identify uniquely the human gesture by reference to a set of rules comprising features that uniquely identify each human gesture.

38. The apparatus of claim 37 wherein the means for providing comprises accelerometers.

39. The apparatus of claim 37 wherein the means for providing comprises at least one video camera.

40. The apparatus of claim 37 wherein the means for transforming, the means for extracting and the means for identifying comprise at least one computer.

* * * * *